United States Patent [19]

Egami et al.

[11] Patent Number: 4,682,041
[45] Date of Patent: Jul. 21, 1987

[54] COATING QUALITY MEASURING DEVICE AND METHOD

[75] Inventors: Tsuneyuki Egami, Gamagori; Tsutomu Saito, Okazaki; Mitosi Ando, Nishio; Ryuzou Hori, Toyota; Takashi Kamo, Toyota; Kazunori Yoshida, Okazaki, all of Japan

[73] Assignees: Nippon Soken, Inc., Nishio; Toyota Jidosha Kabushiki Kaisha, Toyota, both of Japan

[21] Appl. No.: 777,682

[22] Filed: Sep. 19, 1985

[30] Foreign Application Priority Data

Sep. 20, 1984 [JP] Japan ................................ 59-197705

[51] Int. Cl.$^4$ ........................................... G01N 21/86
[52] U.S. Cl. .................................... 250/571; 250/563
[58] Field of Search ............... 250/571, 572, 562, 563; 356/429

[56] References Cited

FOREIGN PATENT DOCUMENTS 52-71289  6/1977  Japan .
52-90988  7/1977  Japan .
58-97608  6/1983  Japan .

Primary Examiner—Gene Wan
Attorney, Agent, or Firm—Cushman, Darby & Cushman

[57] ABSTRACT

A coating quality measuring device and a pattern plate including one reference pattern portion having a large pattern width and a plurality of strip pattern portions each having a smaller pattern width. The pattern plate is disposed opposite the coated surface. The pattern plate is reflected off the coated surface and a reflected image is formed on an image sensor. The image sensor successively outputs signals each corresponding to the light level of each strip pattern portion on a line extending in a width direction of each strip pattern portion of the reflected image. A computing device calculates an average signal level of the signals outputted by the image sensor, divides the difference between the average signal level and the signal level of each signal by the signal level of the reference pattern portion and calculates a square average value of the obtained division value to obtain a measure of the coating quality of the coated surface.

20 Claims, 11 Drawing Figures

COATING QUALITY MEASURING DEVICE AND METHOD

BACKGROUND OF THE INVENTION

1. FIELD OF THE INVENTION

The present invention relates to a device and method for quantitatively measuring the coating quality of a coated surface.

2. DESCRIPTION OF THE PRIOR ART

The coating quality of coated surfaces of a vehicle body or the like has been conventionally measured through the senses such as the sense of sight of a trained workman. This measuring method is defective since it is largely affected by the workman's feeling and obstructs the automation of the production steps of vehicles.

From the above circumstances, devices for objectively measuring the coating quality of the coated surface have been developed.

Examples of these devices are disclosed in Japanese unexamined patent publications Nos. Sho 52-71289 and Sho 58-97608, for example. Each of these devices quantitatively measures the coating quality of the coated surface by positioning a pattern plate having a slit pattern opposite the coated surface and applying light to the coated surface through the slit pattern to form a reflected image of the slit pattern. In this case, the change of sharpness of outlines of the formed reflected image of the slit pattern is quantitatively measured.

Japanese unexamined patent publication No. Sho 52-71289 discloses the steps of slicing the reflected image on a plurality of levels, and detecting the change of the pattern width on each level. In this method, when the pattern width on each level changes by only a small amount, the outline of the reflected image is judged to be sharp, namely the coating quality of the coated surface is judged to be high.

In Japanese unexamined patent publication No. Sho 58-97608, frequency components composing the reflected image are detected. In this method, when the frequency components are on the high frequency side, the outline of the reflected image is judged to be sharp.

However, the device of Japanese unexamined patent publication No. Sho 52-71289 has a problem in that it is extremely difficult to measure slight differences in coating quality between the coated surfaces of high coatings quality. And the device of Japanese unexamined patent publication No. Sho 58-97608 also has a problem in that the calculation for obtaining the frequency components is comparatively complex.

SUMMARY OF THE INVENTION

It is an object of the present invention to provide a coating quality measuring and method which can accurately measure the coating quality of a coated surface by using comparatively simple calculations.

It is another object of the present invention to provide a coating quality measuring device and method which measure the coating quality of a coated surface by detecting the light level changes of a strip pattern image reflected off the coated surface.

It is still another object of the present invention to provide a coating quality measuring device and method which measure the coating quality of the coated surface by statistically processing the light level changes of a plurality of strip pattern images.

A coating quality measuring device and method according to the present invention involves a pattern plate positioned opposite the coated surface to be measured. The pattern plate is provided with a plurality of strip pattern portions having a constant width, which portions are arranged on a surface of said pattern plate, opposite the coated surface at intervals. Each of the strip pattern portions transmits light differently from a ground portion of the pattern plate.

The device and method of the present invention further involves an image-pickup means for image-forming a reflected image of the pattern plate, which image is reflected off the coated surface, scanning the formed reflected image along or near a line extending in a width direction of each pattern portion and successively generating an output signal having a signal level corresponding to the light level of each portion on the scanned line, and a computing means for computing the coating quality of the coated surface by statistically processing the signal level of the successively generated output signals.

DESCRIPTION OF THE DRAWINGS

FIGS. 1 to 6 illustrate a first embodiment of the coating quality measuring device according to the present invention;

FIG. 1 is a diagrammatic view of the device of the first embodiment;

FIG. 2 is a front view of a pattern plate;

FIG. 3 is a block diagram illustrating the hardware of the computing device;

FIG. 5 is a program flow chart illustrating the data processing routine of the computing device;

FIG. 6 is a graph showing the relation between the strip pattern width and the variance value of the output signals of the image-pickup device.

DETAILED DESCRIPTION OF THE EMBODIMENTS

Figure 1:
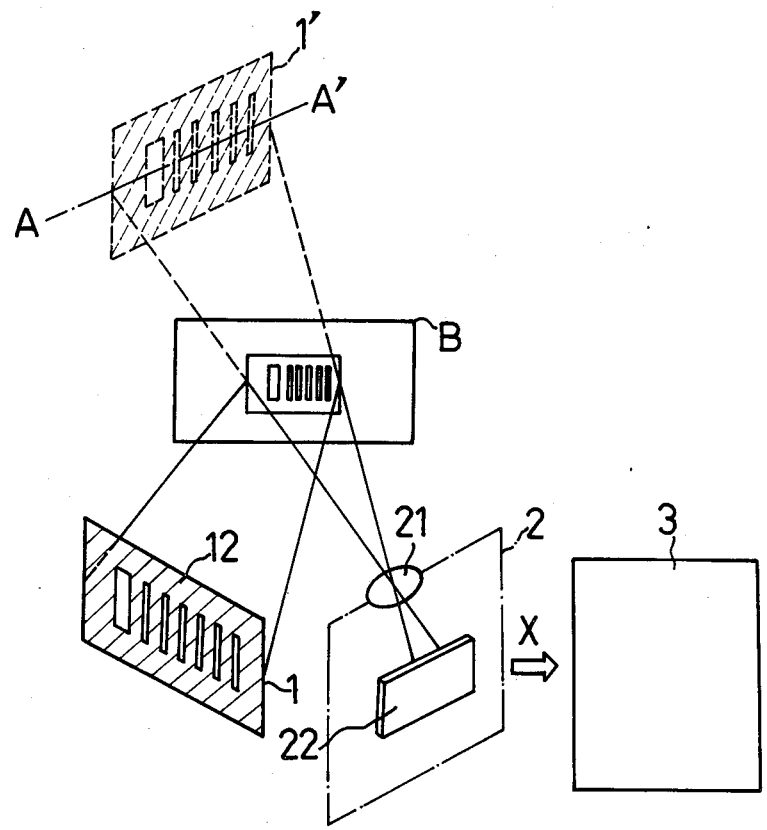

In FIG. 1, a pattern plate 1 is disposed opposite a coated surface B to be measured. A reflected image 1' of the pattern plate 1, which is formed after being reflected on the coated surface B, is image-formed on a charge coupled device (C C D) image sensor 22 provided in an image-pickup means by way of a lens 21 thereof.

The image sensor 22 is provided with a large number of light reception elements along or near the center line of the reflected image (line A—A' in FIG. 1).

A computing device 3 receives output signals X from the light reception elements and calculates the coating quality of the coated surface.

Figure 2:
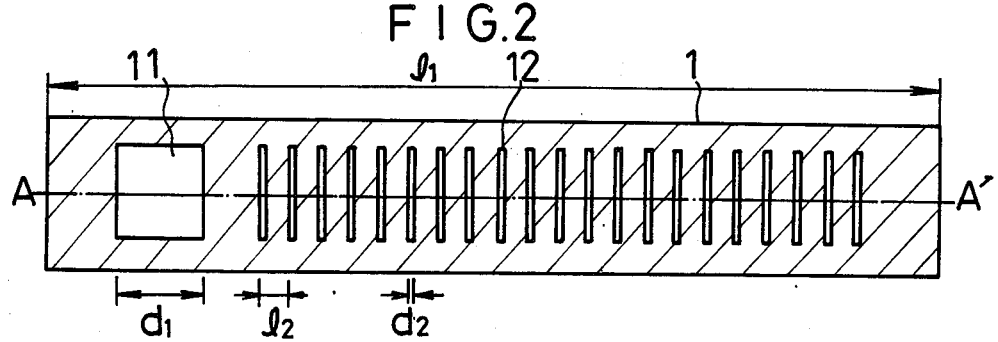

FIG. 2 illustrates the detailed structure of the pattern plate 1. The pattern plate 1 is formed of a photographic film having a length $l_1$, for example. Transparent pattern portions 11 and 12 are formed on a (black) ground portion of the film (the unslit portion shown with diagonal lines). The pattern portion 11 has a larger width $d_1$ and acts as a reference pattern. The pattern portions 12, each having a smaller width $d_2$ are arranged at equal intervals $l_2$.

In the first embodiment, the length $l_1$, the interval $l_2$ and the width $d_1$ are 150 mm, 5 mm and 15 mm, respectively. The width $d_1$ is made large enough not to change the peak value of the light level of the reference pattern portion 11 in the reflected image 1'. The width $d_2$ is set so that the pattern width of each slit pattern portion 12 in the reflected image 1', which is measured on a mirror surface located in the coated surface B, is between 0.15 mm and 0.75 mm as described later. And the distance between the pattern plate 1 and the coated surface B and that between the coated surface B and the lens 21 is 400 mm, respectively.

Figure 3:
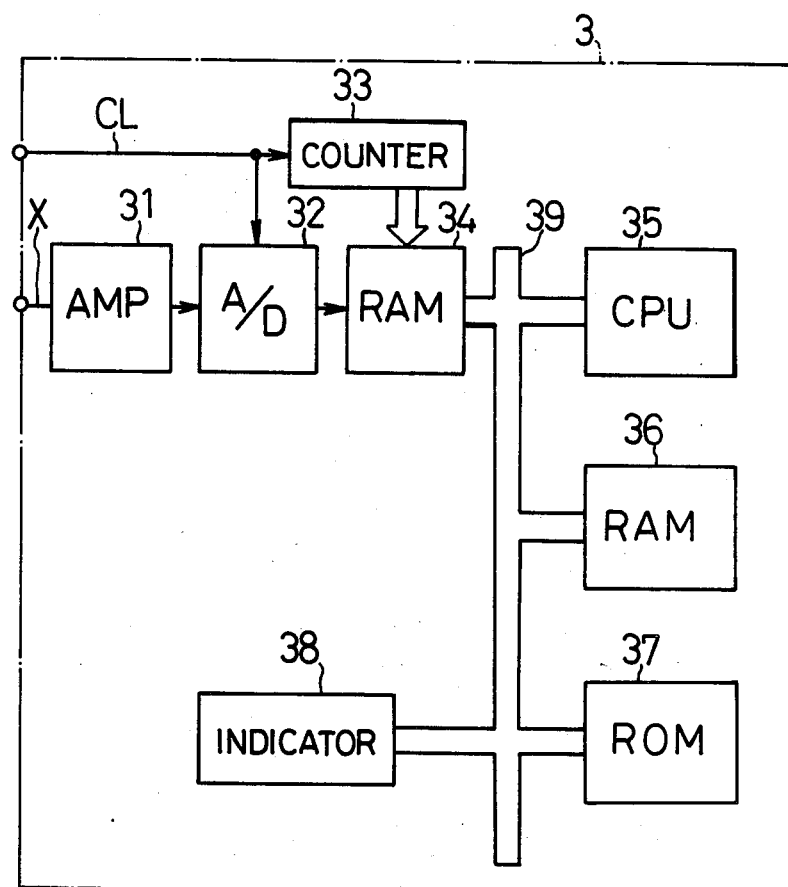
Figure 4A:
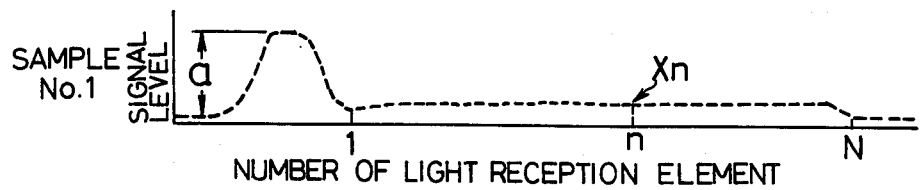
FIG. 4a to 4e are views, each illustrating the signal level of output signals from an image-pickup means on each of coated surface samples having different coating quality.
Figure 4B:
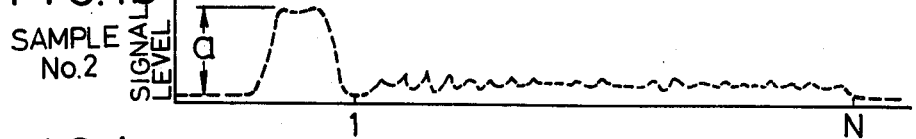
Figure 4C:
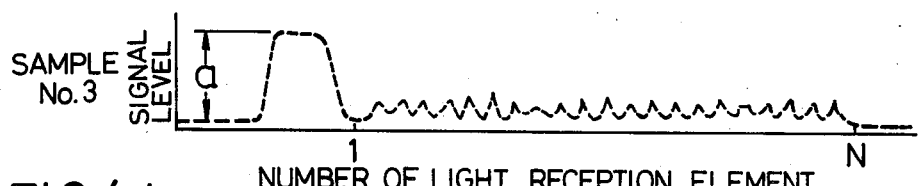
Figure 4D:
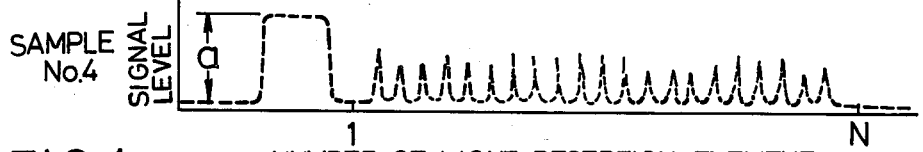
Figure 4E:
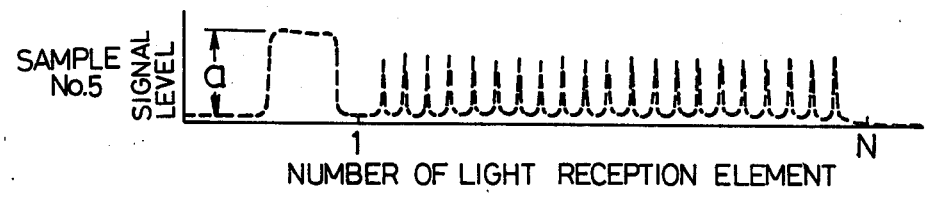

FIG. 3 illustrates the structure of the computing device 3. The computing device 3 comprises an amplifier 31 for amplifying the output signals X of the image sensor 22, an A/D converter 32 for converting the amplified output signals X to digital data simultaneously with a clock signal CL from the image sensor 22, a counter 33 for counting the clock signal CL and a random access memory(RAM) 34 which successively memorizes the digital data in the addresses indicated by the counter 33.

The computing device 3 further comprises a micro computer(CPU) 35, a random access memory(RAM) 36 for working memory, a read only memory(ROM) 37 for accomodating a control program, and a light emission diode(LED) indicator 38, which are connected to one another by a data bus 39.

Hereinafter, the operation of the device according to the present invention will be explained.

FIG. 4 illustrates the signal level of the output signal X of each element of the image sensor 22 provided along the line A—A' of FIG. 2.

The coating quality of samples No. 1 to No. 5 is previously estimated to five ranks through the senses so as to become higher by steps in order.

In FIG. 4, the light reception elements corresponding to the plate portion wherein the strip pattern portions 12 are formed are assigned numbers 1 to N (N=600 in the first embodiment). The level of the output signal of the nth element is expressed by $X_n$.

As is apparent from FIG. 4, the output signal X obtained from the coated surface of higher coating quality sharply changes with the lightness change of the reflected image 1' of the pattern plate 1. The peak level of the output signal obtained from the light reception element corresponding to the reference pattern portion 11 (FIG. 2) is constant (a) in any of the samples No. 1 to No. 5, for the pattern width $d_1$ of the reference pattern portion 11 is made large enough to maintain constant level(a) even for the sample of lowest coating quality.

Figure 5:
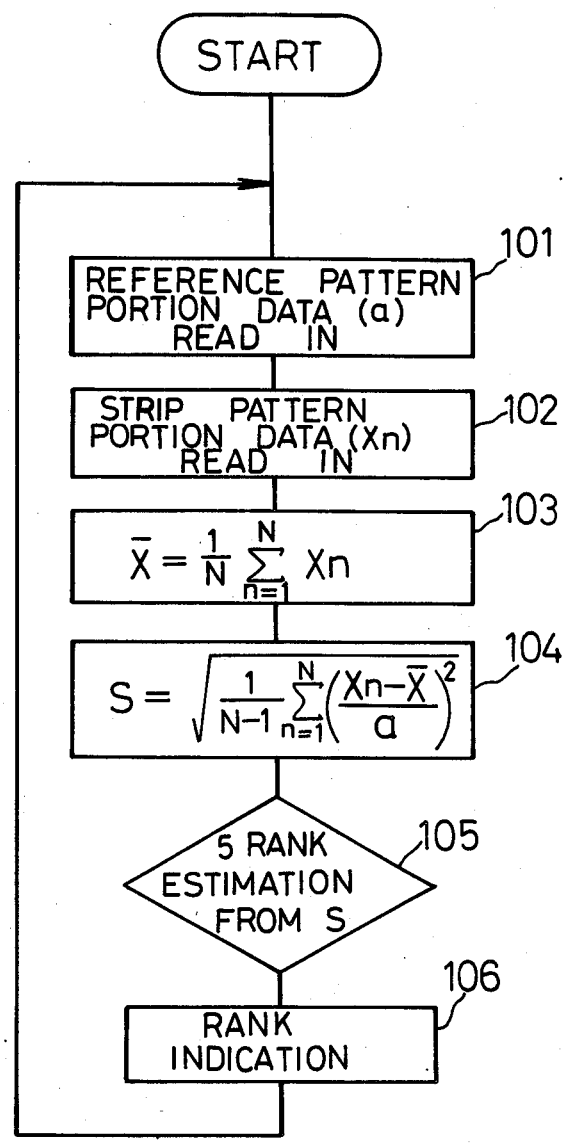

FIG. 5 illustrates the data processing routine of CPU 35 (FIG. 3). In Step 101, the output signal data(a) of the reference pattern portion 11, which is stored in RAM 34 (FIG. 3) is read in. Next, in Step 102, the output signal data $X_n$ of each of 600 light reception elements is inputted. In Step 103, the average value $\overline{X}$ of the above described output signal data $X_n$ is obtained by using the following equation (1) and then in Step 104, the variance value S, that is the square average value is obtained by using the following equation (2).

$$\overline{X} = \frac{1}{N} \sum_{n=1}^{N} X_n \quad (1)$$

$$S = \sqrt{\frac{1}{N-1} \sum_{n=1}^{N} \left( \frac{X_n - \overline{X}}{a} \right)^2} \quad (2)$$

The obtained variance value S is increased as the coating quality of the coated surface B becomes higher. Therefore, the coating quality of the coated surface S can be estimated to five ranks by measuring the variance value S in Step 105. Then, the obtained rank is indicated in Step 106.

Figure 6:
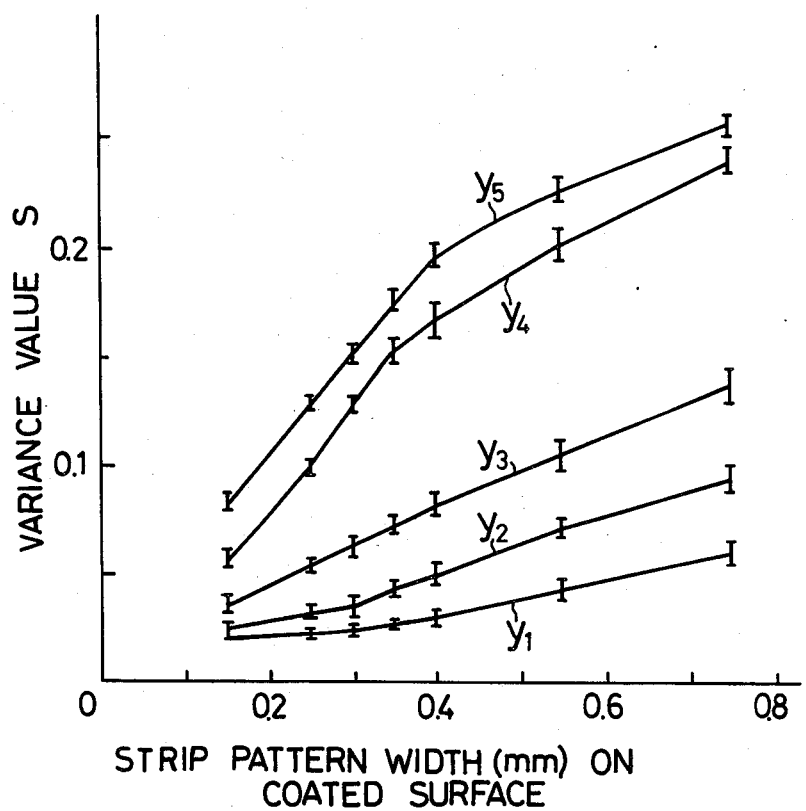

FIG. 6 shows the variance value S of each of the samples No. 1 to No. 5 when the strip pattern width $d_2$ of each sample is variously changed. In this case, the strip pattern width $d_2$ of the reflected image 1' is measured on the coated surface B. In FIG. 6, the lines $y_1$ to $y_5$ correspond to the samples No. 1 to No. 5, respectively. As is apparent from FIG. 6, the samples No. 1 to No. 5 can be clearly distinguished from one another by measuring the variance value of each sample when the strip pattern width $d_2$ thereof is in the range from 0.15 mm to 0.75 mm.

In the first embodiment, the coating quality of the coated surface B is estimated by measuring the variance value S of the output signal X.

Figure 7:
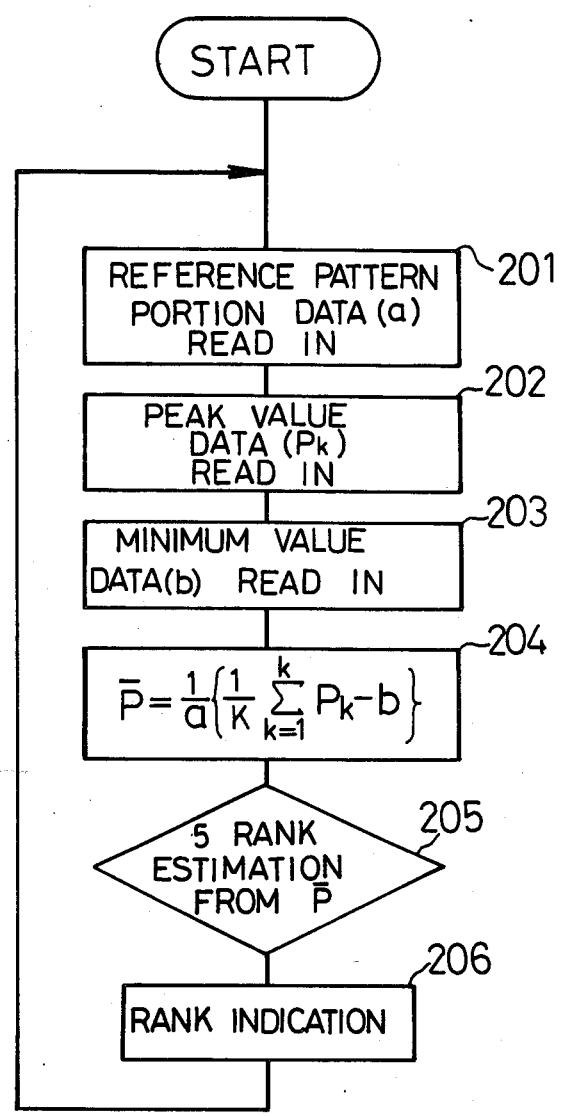
FIG. 7 is a program flow chart illustrating the data processing routine of the computing device of a second embodiment of the device according to the present invention.

In a second embodiment, the coating quality of the coated surface B is estimated by measuring the average value $\overline{P}$ of peak values Pk each appearing in the output signal X corresponding to each strip pattern portion 12. This routine is shown in FIG. 7.

At first, the output signal data (a) of the reference pattern portion 11 is read in in Step 201. Then, the peak values Pk in the output signal data $X_n$ are detected and read in in Step 202. In Step 203, an output signal data (b) corresponding to the black unslit ground portion of the film is read in as a minimum data and in Step 204, the average value $\overline{P}$ is calculated by using the equation (3):

$$\overline{P} = \frac{1}{a} \left( \frac{1}{k} \sum_{k=1}^{k} Pk - b \right) \quad (3)$$

The average value $\overline{P}$ is increased as the coating quality of the coated surface becomes higher.

In Step 205, the coating quality is estimated to five ranks from the average value $\overline{P}$ and in Step 206, the obtained rank is indicated.

In the embodiments of the present invention, the coating quality of the coated surfaces B need not be always estimated to five ranks. For example, ten ranks will do. Instead, the variance value S and the average value $\overline{P}$ may be directly indicated.

Furthermore, a metal oxide semiconductor (MOS) image sensor, a photodiode array or a television camera can be used in place of the CCD image sensor 22.

In the above embodiments, the pattern plate 1 can be illuminated from the back thereof. In this case, the difference in light level between the ground portion and the strip pattern portions becomes large to increase the measurement sensitivity.

As described above, the coating quality measuring device of the present invention comprises a pattern plate wherein a plurality of strip pattern portions, each having a constant width are formed at intervals, which is provided so as to be opposed to a coated surface to be measured, and an image-pickup means for image-forming a reflected image reflected on the coated surface. In the device of the present invention, the coating quality of the coated surface is detected by statistically processing signals corresponding to the light levels of the reflected image, which levels are outputted by the image-pickup means.

According to the present invention, the coating quality of the coated surface can be accurately measured by comparatively simple calculations.

Furthermore, the device and method of the present invention can measure the coating quality of the coated surface over a comparatively wide area since a plurality of strip pattern portions are arranged in the pattern plate at intervals.

The result of measurement by the device of the present invention almost coincides with a person's eye measurement.

In the above embodiments, the reference pattern portion is provided in the pattern plate for obtaining the ratio of the output signals of a plurality of strip pattern portions to the output signal of the reference pattern portion in the reflected image. Therefore, the measurement accuracy is not reduces by extraneous light incident upon the coated surface.

The pattern width of each strip pattern portion must be properly adjusted in accordance with the kind of the coated surface to be measured. However, the experimental results achieved by the present inventors shows that the coated surface of a vehicle body can be satisfactorily measured by setting the strip pattern width within the above described width range.

What is claimed is:

1. A coating quality measuring device for measuring the coating quality of a coated surface, comprising:
   a pattern plate positioned opposite the coated surface to be measured, said pattern plate being provided with a plurality of strip pattern portions arranged at intervals on a surface of said pattern plate opposite the coated surface, each of said strip pattern portions having a constant width and transmitting light differently than a ground portion of said pattern plate, said pattern plate including a reference pattern portion having a width greater than said constant width, said reference pattern portion width being large enough that a level of light of an image of said reference pattern portion reflected from said coated surface remains substantially invariant to changes in coating quality;
   image-pickup means for forming an image of said pattern plate reflected off said coated surface, and for scanning the formed reflected image along a line extending in a width direction of each pattern portion, and for successively generating output signals having signal levels which vary corresponding to a light level of the reflected image of each said pattern portion and said ground portion along the scanned line; and
   computing means for computing the coating quality of the coated surface by processing the signal levels of successively generated output signals.

2. A coated surface measuring device according to claim 1, wherein said pattern plate is further provided with one reference pattern portion having a pattern width large enough not to change the peak value of lightness of a portion corresponding to said reference pattern portion in the reflected image due to the coating quality of the coated surface.

3. A coated surface measuring device according to claim 1, wherein said pattern plate comprises photographic film, and wherein said pattern portions are transparent and are formed on a nontransparent ground portion of said film.

4. A coated surface measuring device according to claim 1, wherein said image-pickup means comprises:
   lens means for forming the reflected image;
   a plurality of linearly arranged light reception elements for generating light reception signals corresponding to the light level of the pattern portions of the reflected image; and
   image sensor means for successively outputting the light reception signals simultaneously with a clock pulse.

5. A coated surface measuring device according to claim 1, wherein said computing means includes means for calculating an average signal level of the output signals and a square average value of the difference between the calculated average signal level and the signal level of each output signal to obtain a measure of the coating quality of the coated surface.

6. A coated surface measuring device according to claim 1, wherein said computing means includes means for calculating an average value of the difference between the peak value of the signal level of each output signal corresponding to each strip pattern portion of the reflected image and the signal level of each output signal corresponding to said ground portion of the reflected images to obtain a measure of the coating quality of the coated surface.

7. A coated surface measuring device according to claim 2, wherein said computing means includes means for (a) calculating an average signal level of the output signals, (b) dividing the difference between the calculated average signal level and each signal level of the output signals by the signal level of the reference pattern portion of the reflected image, and (c) calculating a square average value of the obtained division value to obtain a measure of the coating quality of the coated surface.

8. A coated surface measuring device according to claim 1, wherein said computing means includes means for (a) dividing the difference between each peak value of the signal level of each output signal corresponding to the strip pattern portions of the reflected image and the signal level of each output signal corresponding to the ground portion of the reflected image by the signal level of the output signal of the reference pattern portion of the reflected image, and (b) calculating an average value of the obtained division value to obtain a measure of the coating quality of the coated surface.

9. A coated surface measuring device according to claim 1, wherein each of said strip pattern portions of said pattern plate has a pattern width ranged from substantially 0.15 mm to substantially 0.75 mm on the reflected image measured on the coated surface.

10. Apparatus for measuring the surface quality of a coated surface, comprising:
    pattern producing means for producing a pattern on said coated surface, said pattern producing means including a plurality of strip portions each having a first width, a reference portion having a second width greater than said first width, and a ground portion;
    light detection means for detecting an image of said pattern reflected from said coated surface, the reflected image including images of said strip portions, said reference portion, and said ground portion, said light detection means providing an output signal having a level which varies in accordance with light levels of the reflected images of said strip portions, said reference portion, and said ground portion; and processing means for receiving said output signal and providing an output quality signal based on the varying level of said output signal.

11. Apparatus according to claim 10 wherein said light detection means includes N photodetector elements, and wherein said processing means includes means for (a) storing an output signal level A corresponding to the light level of the reflected image of said reference portion, (b) storing the output signal levels Xn corresponding to the light levels of the reflected images of said strip portions, (c) calculating an average value $\overline{X}$ of said output signal levels Xn, and (d) calculating a variance S of said output signal levels according to the following equation:

$$S = \sqrt{\left(\frac{1}{N-1}\right) \sum_{n=1}^{N} \left(\frac{Xn - \overline{X}}{A}\right)^2}.$$

12. Apparatus according to claim 10 wherein said light detection means includes N photodetector elements, and wherein said processing means includes means for (a) storing an output signal level A corresponding to the light level of the reflected image of said reference portion, (b) storing output signal peak values Pk corresponding to peak light levels of the reflected images of said strip portions, (c) storing an output signal level B corresponding to the light level of the reflected image of said ground portion, and (d) calculating an average value $\overline{P}$ of said peak values Pk according to the following equation:

$$\overline{P} = \frac{1}{A}\left[\frac{1}{K} \sum_{k=1}^{k} Pk - B\right].$$

13. Apparatus according to claim 10 wherein said light detection means includes a plurality of photodetector elements arranged in a linear array which forms an angle with a longitudinal direction of one of the strip portions in the reflected image.

14. Apparatus according to claim 13 wherein said light detection means includes means for scanning said plurality of photodetector elements along a longitudinal axis of said linear array.

15. Apparatus according to claim 10 wherein said pattern producing means includes transparent portions comprising said strip portions and said reference portion, and nontransparent portions comprising said ground portion.

16. Apparatus according to claim 10 wherein said reference portion width has a dimension to cause the light level of the reflected image of said reference portion to remain substantially invariant to changes in surface quality.

17. A method of measuring the surface quality of a coated surface, comprising the steps of:

producing a pattern on said coated surface, with a pattern producing means having a plurality of strip portions each having a first width, a reference portion having a second width greater than said first width, and a ground portion;

detecting an image of said pattern reflected from said coated surface with light detection means, the reflected image including images of said strip portions, said reference portion, and said ground portion, said light detection means providing an output signal having a level which varies in accordance with light levels of the reflected images of said strip portions, said reference portion, and said ground portion; and receiving said output signal and providing an output quality signal based on the varying level of said output signal.

18. A method according to claim 17 wherein said light detection means includes N photodetector elements, and wherein said processing step includes the step of:

storing an output signal level A corresponding to the light level of the reflected image of said reference portion;

storing the output signal levels Xn corresponding to the light levels of the reflected images of said strip portions;

calculating an average value $\overline{X}$ of said output signal levels Xn; and calculating a variance S of said output signal levels according to the following equation:

$$S = \sqrt{\left(\frac{1}{N-1}\right) \sum_{n=1}^{N} \left(\frac{Xn - \overline{X}}{A}\right)^2}.$$

19. A method according to claim 17 wherein said light detection means includes N photodetector elements, and wherein said processing step includes the step of:

storing an output signal level A corresponding to the light level of the reflected image of said reference portion;

storing output signal peaks values Pk corresponding to peak light levels of the reflected images of said strip portions;

storing an output signal level B corresponding to the light level of the reflected image of said ground portion; and calculating an average value $\overline{P}$ of said peak values Pk according to the following equation:

$$\overline{P} = \frac{1}{A}\left[\frac{1}{K} \sum_{k=1}^{k} Pk - B\right].$$

20. A method according to claim 17 wherein said pattern producing step includes the step of providing a reference portion such that said reference portion width has a dimension to cause the light level of the reflected image of said reference portion to remain substantially invariant to changes in surface quality.

* * * * *